US012333425B2

(12) United States Patent
Lei et al.

(10) Patent No.: US 12,333,425 B2
(45) Date of Patent: Jun. 17, 2025

(54) HYBRID GRAPH NEURAL NETWORK

(71) Applicant: International Business Machines Corporation, Armonk, NY (US)

(72) Inventors: Chuan Lei, Cupertino, CA (US); Junheng Hao, Los Angeles, CA (US); Vasilis Efthymiou, San Jose, CA (US); Fatma Ozcan, San Jose, CA (US); Abdul Quamar, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1105 days.

(21) Appl. No.: 17/161,152

(22) Filed: Jan. 28, 2021

(65) Prior Publication Data

US 2022/0237447 A1 Jul. 28, 2022

(51) Int. Cl.
*G06N 3/08* (2023.01)
*G06F 16/28* (2019.01)
(Continued)

(52) U.S. Cl.
CPC ............. *G06N 3/08* (2013.01); *G06F 16/284* (2019.01); *G06N 3/04* (2013.01); *G06N 3/042* (2023.01); *G06N 3/045* (2023.01); *G06N 5/02* (2013.01)

(58) Field of Classification Search
CPC ............ G06N 3/08; G06N 3/04; G06N 3/045; G06N 3/042; G06N 5/02; G06F 16/284
See application file for complete search history.

(56) References Cited

U.S. PATENT DOCUMENTS 6,424,973 B1   7/2002   Baclawski
7,328,209 B2   2/2008   Das et al.
(Continued)

FOREIGN PATENT DOCUMENTS

CN   102360394 B   1/2013
CN   110134943 A   8/2019

OTHER PUBLICATIONS

Alani, Harith. "Position paper: ontology construction from online ontologies." Proceedings of the 15th international conference on World Wide Web. 2006. (Year: 2006).*
(Continued)

*Primary Examiner* — Michelle T Bechtold
*Assistant Examiner* — Nicholas S Wu
(74) *Attorney, Agent, or Firm* — Garg Law Firm, PLLC; Rakesh Garg; James Olsen

(57) ABSTRACT

An embodiment includes extracting, responsive to an update request from a remote requesting system, technical descriptor data from a data source. The embodiment also includes forming a new graph data structure using the technical descriptor data extracted from the data source. The embodiment also includes augmenting the new graph data structure to include a concept based on a value from instance data from the data source. The embodiment also includes identifying a first pair of concepts that are connected in a pre-existing ontology that correspond with a second pair of concepts that lack a connection therebetween in the new graph structure. The embodiment also includes augmenting the new graph data structure to include a connection between the second pair of concepts. The embodiment also includes outputting the new graph data structure as part of a response to the update request from the requesting system.

20 Claims, 10 Drawing Sheets

(51) Int. Cl.
  *G06N 3/04*    (2023.01)
  *G06N 3/042*   (2023.01)
  *G06N 3/045*   (2023.01)
  *G06N 5/02*    (2023.01)

(56) References Cited

U.S. PATENT DOCUMENTS

| | | | |
|---|---|---|---|
| 7,840,512 | B2 | 11/2010 | Pandya et al. |
| 9,747,563 | B2 | 8/2017 | Lee et al. |
| 10,169,454 | B2 | 1/2019 | Ait-Mokhtar et al. |
| 2002/0059289 | A1 | 5/2002 | Wenegrat et al. |
| 2006/0074833 | A1 | 4/2006 | Gardner et al. |
| 2007/0143285 | A1 | 6/2007 | Drumm et al. |
| 2010/0131516 | A1 | 5/2010 | Jean-Mary |
| 2012/0078595 | A1 | 3/2012 | Balandin et al. |
| 2016/0005016 | A1* | 1/2016 | Eliahu ............ G06Q 20/1235 705/44 |
| 2016/0117395 | A1 | 4/2016 | Geller et al. |
| 2017/0185674 | A1 | 6/2017 | Tonkin et al. |
| 2017/0308799 | A1 | 10/2017 | Eidelman et al. |
| 2018/0096252 | A1 | 4/2018 | Fagundes et al. |
| 2020/0285944 | A1 | 9/2020 | Lee et al. |
| 2021/0295822 | A1* | 9/2021 | Tomkins ............ G06F 16/3338 |
| 2021/0397942 | A1 | 12/2021 | Collomosse |
| 2022/0179882 | A1 | 6/2022 | Cervantes et al. |

OTHER PUBLICATIONS

Ahmed, Waqas, et al. "A light weight approach for ontology generation and change synchronization between ontologies and source relational databases." Proceedings of the 2011 15th International Conference on Computer Supported Cooperative Work in Design (CSCWD). IEEE, 2011. (Year: 2011).*

Žitnik, Slavko, Marko Bajec, and Dejan Lavbič. "LogMap+: Relational data enrichment and linked data resources matching." 2017 11th International Conference on Research Challenges in Information Science (RCIS). IEEE, 2017. (Year: 2017).*

Chami, Ines, et al. "Hyperbolic graph convolutional neural networks." Advances in neural information processing systems 32 (2019). (Year: 2019).*

Krivosheev, Evgeny, et al. "Siamese graph neural networks for data integration." arXiv preprint arXiv:2001.06543 (2020). (Year: 2020).*

Zhu, Zhihua, et al. "HGCN: A heterogeneous graph convolutional network-based deep learning model toward collective classification." Proceedings of the 26th ACM SIGKDD international conference on knowledge discovery & data mining. 2020. (Year: 2020).*

Wu, Yuting, et al. "Neighborhood Matching Network for Entity Alignment." Proceedings of the 58th Annual Meeting of the Association for Computational Linguistics. 2020. (Year: 2020).*

Maedche, Alexander, and Steffen Staab. "Measuring similarity between ontologies." International Conference on Knowledge Engineering and Knowledge Management. Berlin, Heidelberg: Springer Berlin Heidelberg, 2002. (Year: 2002).*

Hu, Wei, and Yuzhong Qu. "Block matching for ontologies." International Semantic Web Conference. Berlin, Heidelberg: Springer Berlin Heidelberg, 2006. (Year: 2006).*

Le, Matt, et al. "Inferring concept hierarchies from text corpora via hyperbolic embeddings." arXiv preprint arXiv: 1902.00913 (2019). (Year: 2019).*

Jimenez-Ruiz et al., LogMap: Logic-Based and Scalable Ontology Matching, Oct. 2011.

Faria et al.,The AgreementMakerLight Ontology Matching System, 2013.

Kolyvakis et al., DeepAlignment: Unsupervised Ontology Matching with Refined Word Vectors, Jun. 1-6, 2018.

Kolyvakis et al., Biomedical ontology alignment: an approach based on representation learning, Journal of Biomedical Semantics, 2018.

Wang et al.,Cross-lingual Knowledge Graph Alignment via Graph Convolutional Networks, Proceedings of the 2018 Conference on Empirical Methods in Natural Language Processing, Oct. 31-Nov. 4, 2018.

Wu et al., Relation-Aware Entity Alignment for Heterogeneous Knowledge Graphs, Aug. 22, 2019.

Sun et al., Knowledge Graph Alignment Network with Gated Multi-Hop Neighborhood Aggregation, The Thirty-Fourth AAAI Conference on Artificial Intelligence (AAAI-20), 2020.

Sun et al., A Benchmarking Study of Embedding-based Entity Alignment for Knowledge Graphs, Jul. 20, 2020.

Chen et al., Multilingual Knowledge Graph Embeddings for Cross-lingual Knowledge Alignment, Proceedings of the Twenty-Sixth International Joint Conference on Artificial Intelligence (IJCAI-17), 2017.

GitHub, AgreementMakerLight, 2020, https://github.com/AgreementMakerLight.

Ruiz, LogMap: An Ontology Alignment and Alignment Repair System, GitHub, 2020, https://github.com/ernestojimenezruiz/logmap-matcher.

GitHub, LogMap, http://krrwebtools.cs.ox.ac.uk/logmap/, 2021.

List of all related dockets, 2021.

* cited by examiner

HYBRID GRAPH NEURAL NETWORK

BACKGROUND

The present invention relates generally to a method, system, and computer program product for ontology matching. More particularly, the present invention relates to a method, system, and computer program product for a hybrid graph neural network for ontology matching.

Artificial intelligence (AI) technology has evolved significantly over the past several years and have given way to various types of AI technologies. For example, an Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior. Examples of ANNs include Deep Learning Neural Networks (DNNs) and Graph Neural Networks (GNNs).

A DNN is an ANN with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

A GNN is a deep learning based ANN that operates on graph data structures, or simply "graphs." Graphs are formed of nodes connected by edges. Nodes represent concepts or objects, and edges represent relationships between the nodes they connect. A GNN provides a power tool for graph analysis.

In recent years, many domain-specific ontologies have been created from various data sources, semi-automatically or by human experts. An ontology is a representation of knowledge by a set of concepts and relationships between the concepts, where the knowledge is included within one or more software-based applications. Domain-specific ontologies define, standardize and structure concepts in particular categories, such as medical or agricultural domains. Examples of domain-specific ontologies can be found for many different industries, particularly where disambiguation of terms may be critically important, such as various areas of science, medicine, and finance. Such domain-specific ontologies provide valuable knowledge to support applications in these and other domains for content browsing, ontology-based question answering, and data exchange and integration. Ontologies are also frequently used for standardization of information, knowledge sharing, and reusability.

SUMMARY

The illustrative embodiments provide for hybrid graph neural network. An embodiment includes extracting, responsive to an update request from a remote requesting system, technical descriptor data from a data source, wherein the technical descriptor data describes a construct of a data structure of the data source. The embodiment also includes forming a new graph data structure using the technical descriptor data extracted from the data source. The embodiment also includes augmenting the new graph data structure to include a concept based on a value from instance data from the data source. The embodiment also includes identifying a first pair of concepts that are connected in a pre-existing ontology that correspond with a second pair of concepts that lack a connection therebetween in the new graph structure. The embodiment also includes augmenting the new graph data structure to include a connection between the second pair of concepts. The embodiment also includes outputting the new graph data structure as part of a response to the update request from the requesting system. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
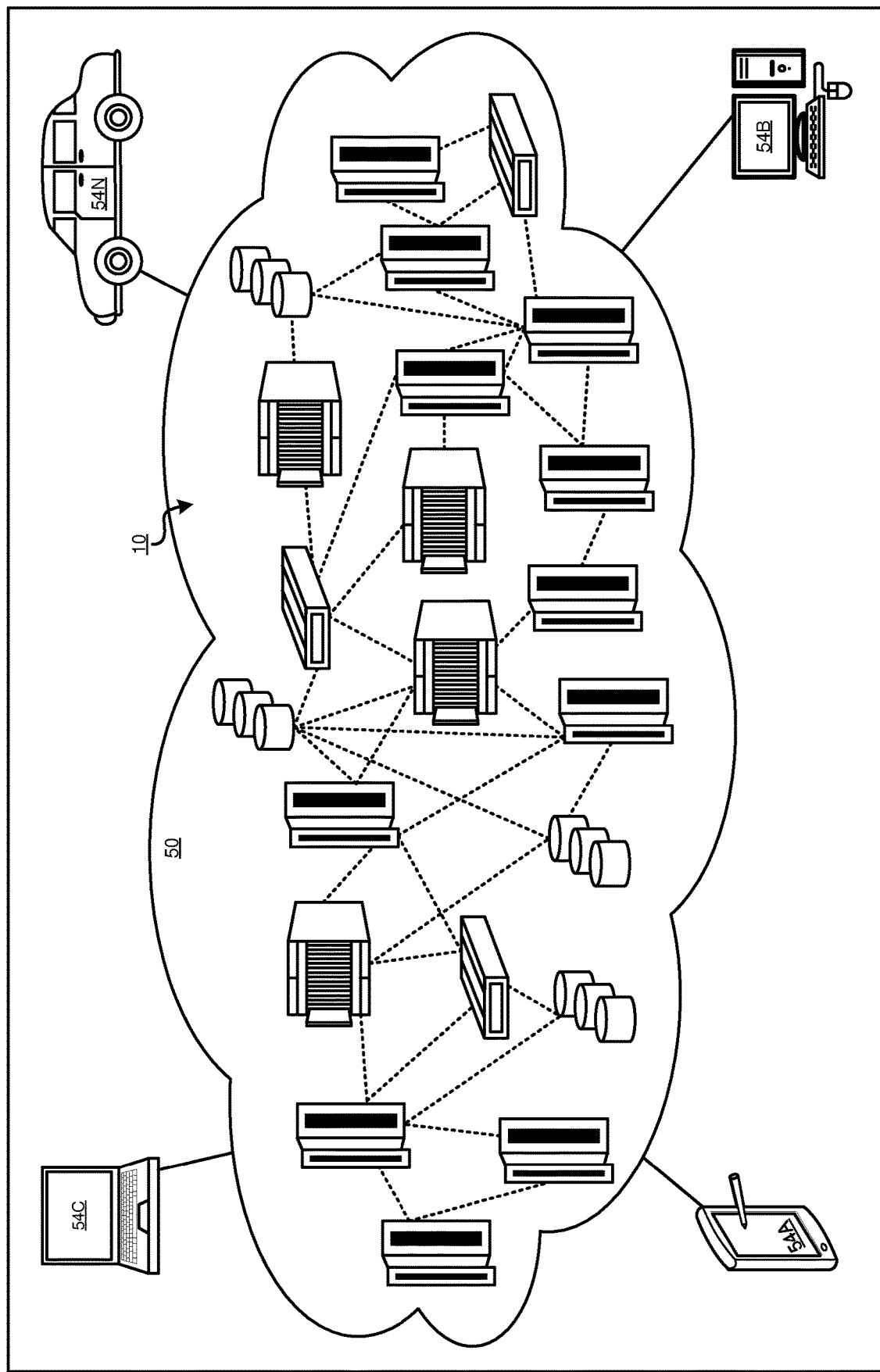
FIG. 1 depicts a block diagram of a network of data processing systems in which illustrative embodiments may be implemented.

Domain-specific ontologies are widely used to describe and organize terminologies and to support many applications. The term "ontology" as used herein refers to a computational ontology of concepts (or classes) of a domain arranged as nodes in a graph data structure with related nodes being connected by links (or edges) that express how the nodes are related. Relationships between nodes may generally be categorized as either an "is-a" (or hierarchical) relationship or a semantic (or non-hierarchical) relationship. Ontologies are either manually curated or derived from a relational database, and often use terminology and structures that differ from one ontology to another. As a result, different datasets conform to different ontologies, preventing data integration and interoperability among databases and applications. To address this challenge, one needs to align the terminologies used in different ontologies by identifying correspondences among concepts across ontologies with overlapping content.

There have been existing efforts devoted to ontology matching. Most of them rely on logical reasoning and rule-based methods to extract various sophisticated features from the ontologies. These terminological and structural features are then used to compute ontological concept similarities that drive the ontology matching. However, deriving such features for a given ontology can be time-consuming. Worse yet, the features in one ontology often do not transfer directly to others. Consequently, the accuracy and robustness of ontology matching based on different features vary greatly with different ontologies to be matched.

Illustrative embodiments recognize that a distinct characteristic of some ontologies, such as medical ontologies, is their deep domain specialization. These ontologies often have rich hierarchical top-down structures, which systematically organize concepts into categories and subcategories of different levels from general to specific. As a result, hierarchical (through "is-A" relations) neighborhoods of some concepts are very similar between different ontologies. Illustrative embodiments recognize that capturing such hierarchical structures separately helps to identify matching concepts and improve the accuracy of ontology matching.

Also, ontologies often are non-isomorphic in the local neighborhood structures of a pair of matching concepts from different ontologies. Such domains often have rich and complex vocabularies, abundant sources of domain knowledge, and different modeling views that all greatly contribute to such non-isomorphism. Fortunately, many ontologies have top-level concepts provided by domain experts, and such concepts provide a global context for matching concepts. For example, a medical ontology may include the concept "clinical finding" as the top-level category of "renal failure." Illustrative embodiments recognize that top-level categories such as this may be used to help differentiate different concepts (e.g., help differentiate "renal failure" from "renal dialysis," which belongs to a "procedure" category).

Illustrative embodiments also recognize that there are situations where data in a relational database needs to be matched with an external ontology to standardize the terminology and enrich the semantic information for various medical applications. For these cases, illustrative embodiments recognize that an ontology can generated from the relational database using its metadata, and enrich the ontology further by using instance-level information from the database, and incorporate a richer set of semantic relationships, resulting in an ontology that can be matched to an external ontology with high precision.

In an illustrative embodiment, an ontology graph neural network configuration (OntoGNN) performs an ontology matching process of finding semantic correspondences between concepts in two ontologies (i.e., the source and target ontologies). The two ontologies define, standardize, and structure concepts in the same or overlapping domains. For example, in some embodiments, the source and target ontologies are medical ontologies created from various healthcare resources, semiautomatically or by human experts, and provide valuable knowledge to support many healthcare applications, such as medical content browsing, clinical documentation, and evidence-based healthcare. However, different medical datasets conform to different ontologies, preventing data integration and interoperability among medical databases and applications.

To address this challenge, the illustrated embodiment aligns the terminologies used in different ontologies by identifying correspondences among concepts across ontologies with overlapping content. The illustrated embodiment includes an ontology-matching framework named OntoGNN based on graph representation learning. The OntoGNN embeds ontologies into two representations that are complementary to each other. Both representations are jointly optimized to improve the ontology matching capabilities. In the illustrated embodiment, the OntoGNN employs hyperbolic graph convolution layers, to encode parent and child concepts of each concept in the hyperbolic space, capturing the hierarchical characteristics in an ontology, and employs heterogeneous graph layers, to incorporate both the local structure and the global context into concept embeddings to enrich the features of each concept.

The overall architecture of the OntoGNN inputs source and target ontologies from a first knowledge base and a second knowledge base, respectively, into respective embedding layers, which then split the respective inputs into two facets each—the output of the embedding layer is split between the one or more hyperbolic graph convolutional layers and the one or more heterogenous graph layers, and the output from the embedding layer is split between one or more hyperbolic graph convolutional layers and one or more heterogenous graph layers. Specifically, the hierarchical facets are fed into the one or more hyperbolic graph convolutional layers or one or more hyperbolic graph convolutional layers and the non-hierarchical facets are fed into the one or more heterogenous graph layers or one or more heterogenous graph layers. The predictive matching module minimizes the contrastive matching loss to let the representations of matching concepts have a very small distance while those of unmatched concepts have a large distance. In the illustrated embodiment, the predictive matching module outputs the distances for concept pairs as an output vector. In some embodiments, the output vector is used to create or update a mapping file that contains classes or concepts from external database systems or ontologies indexed to identical, similar, or related terms in an internal or known system.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
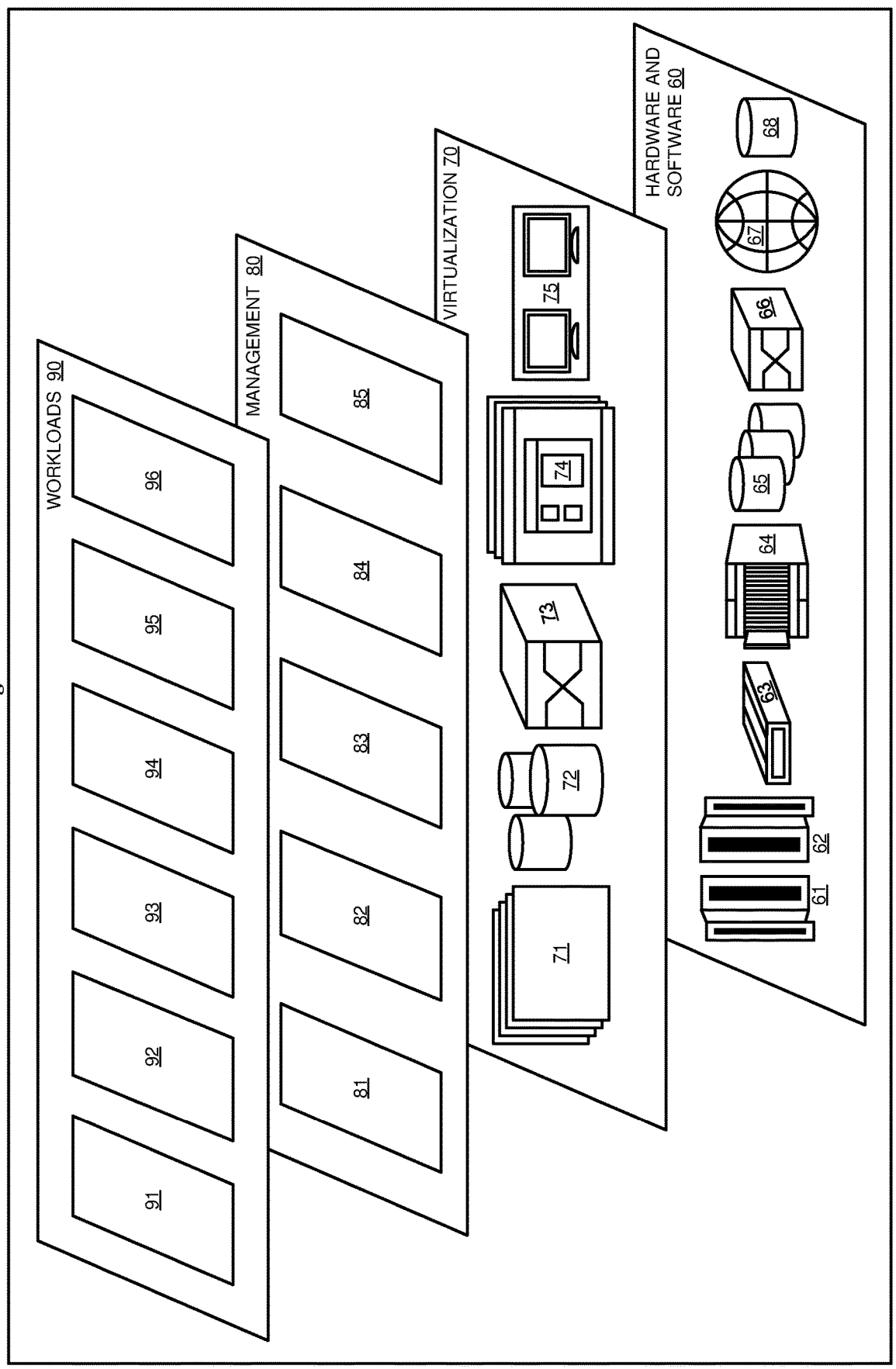
FIG. 2 depicts a block diagram of a data processing system in which illustrative embodiments may be implemented.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ontology web service 96.

Figure 3:
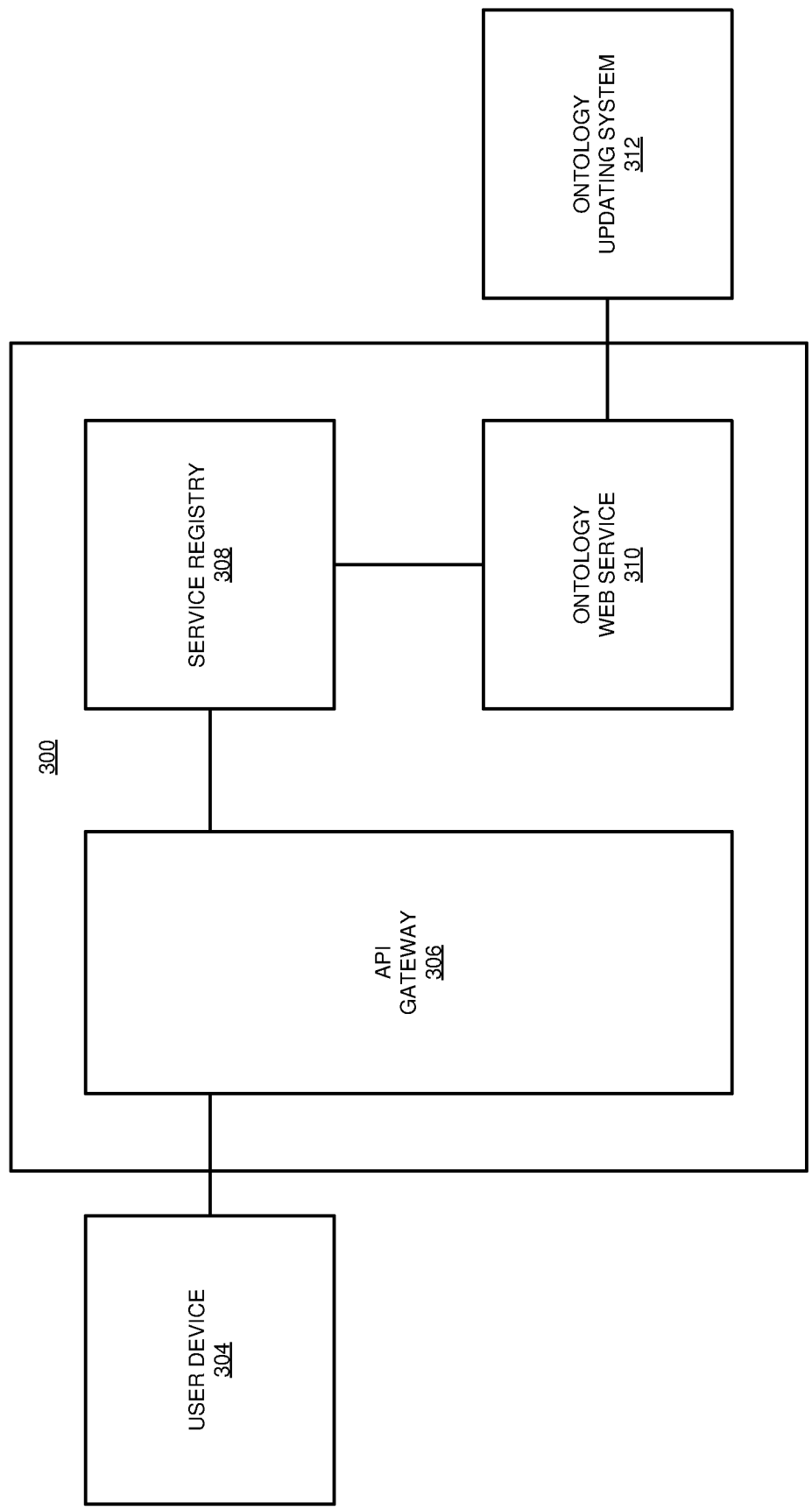
FIG. 3 depicts a block diagram of an example service infrastructure that includes an ontology web service in accordance with an illustrative embodiment.

With reference to FIG. 3, this figure depicts a block diagram of an example service infrastructure 300 that includes an ontology web service 310 in accordance with an illustrative embodiment. In some embodiments, the ontology web service 310 is deployed in workloads layer 90 of FIG. 2. By way of example, in some embodiments, ontology web service 310 is implemented as ontology web service 96 in FIG. 2.

In the illustrated embodiment, the service infrastructure 300 provides services and service instances to a user device 304. User device 304 communicates with service infrastructure 300 via an API gateway 306. In various embodiments, service infrastructure 300 and its associated ontology web service 310 serve multiple users and multiple tenants. A tenant is a group of users (e.g., a company) who share a common access with specific privileges to the software instance. Service infrastructure 300 ensures that tenant specific data is isolated from other tenants.

In the illustrated embodiment, service infrastructure 300 includes a service registry 308. In some embodiments, service registry 308 looks up service instances of ontology web service 310 in response to a service lookup request such as one from API gateway 306 in response to a service request from user device 304. For example, in some embodiments, the service registry 308 looks up service instances of ontology web service 310 in response to requests related to experience encapsulation processing from the user device 304.

In some embodiments, the service infrastructure 300 includes one or more instances of the ontology web service 310. In some such embodiments, each of the multiple instances of the ontology web service 310 run independently on multiple computing systems. In some such embodiments, ontology web service 310, as well as other service instances of ontology web service 310, are registered in service registry 308.

In some embodiments, service registry 308 maintains information about the status or health of each service instance including performance information associated each of the service instances. In some such embodiments, such information may include various types of performance characteristics of a given service instance (e.g., cache metrics, etc.) and records of updates. For example, from time to time an administrator updates the ontology web service 310 using an ontology updating system 312. As described in more detail herein, ontology updating system 312 updates ontologies available through the ontology updating system 312 in various ways, including performing an ontology mapping process that discovers connections between concepts of different ontologies that are within a common domain.

In some embodiments, user device 304 connects with API gateway 306 via any suitable network or combination of networks such as the Internet, etc. and uses any suitable communication protocols such as Wi-Fi, Bluetooth, etc. Service infrastructure 300 may be built on the basis of cloud computing. API gateway 306 provides access to client applications like ontology web service 310. API gateway 306 receives service requests issued by client applications, and creates service lookup requests based on service requests. As a non-limiting example, in an embodiment, the user device 304 executes a routine to initiate interaction with an ontology using the ontology web service 310. For instance, in some embodiments, the user accesses the ontology web service 310 directly using a command line or GUI to review or search ontologies. Also, in some embodiments, the user accesses the ontology web service 310 indirectly through the use of a web application that interacts with the ontology web service 310 via the API gateway 306. There are many applications that use ontologies. For example, within the field of artificial intelligence, applications for ontologies include content-based indexing and retrieval, scene interpretation, clinical decision support, and, as discussed below, sentiment analysis of documents.

Figure 4:
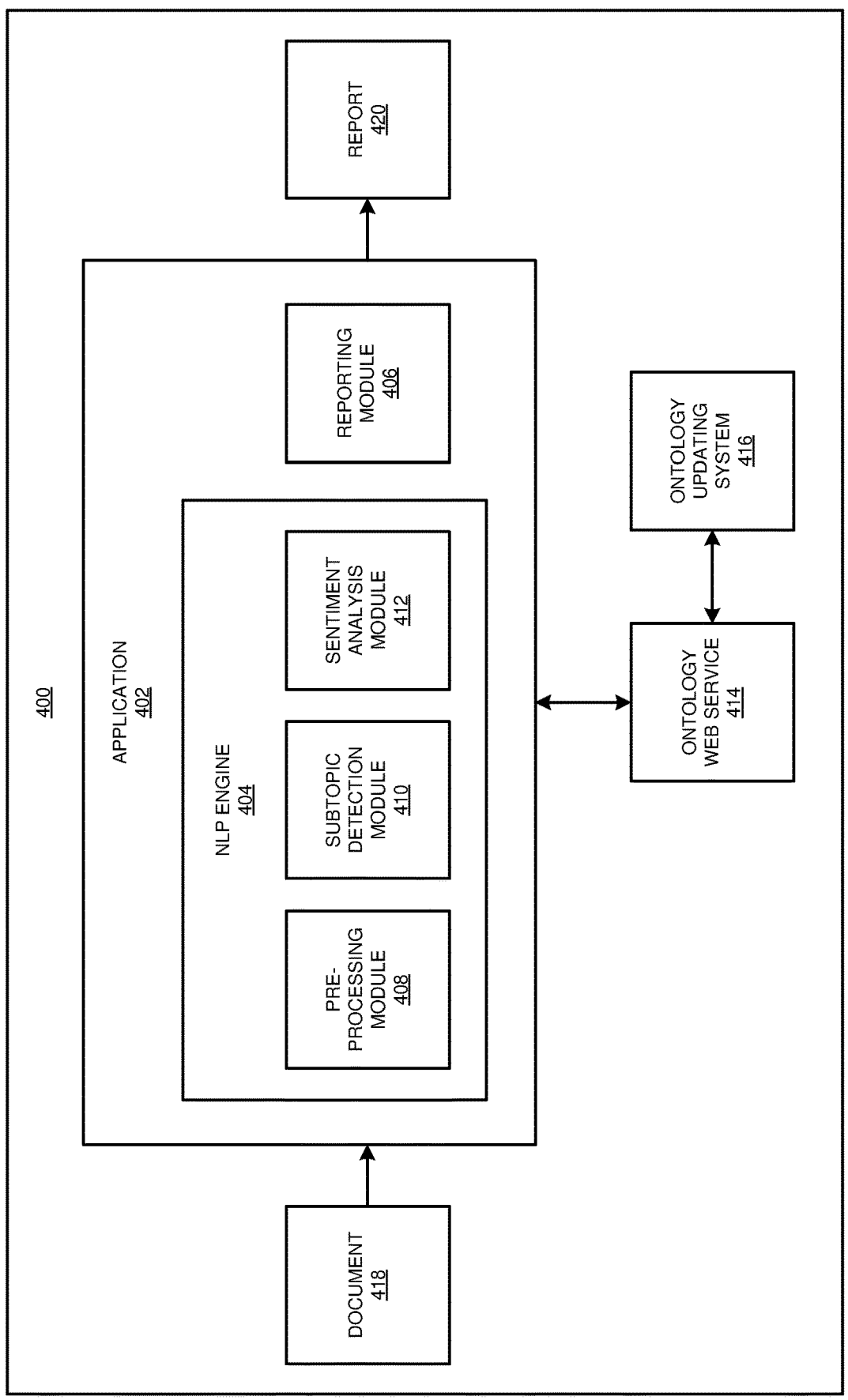
FIG. 4 depicts a block diagram of an example configuration for sentiment analysis of documents in accordance with an illustrative embodiment.

With reference to FIG. 4, this figure depicts a block diagram of an example configuration 400 for sentiment analysis of documents in accordance with an illustrative embodiment. Configuration 400 includes an application 402 that accesses an ontology web service 414, which is an example of ontology web service 310 in FIG. 3, and which is updated by ontology updating system 416, which is an example of ontology updating system 312.

In the illustrated embodiment, the application 402 includes a Natural Language Processing (NLP) engine 404 and a reporting module 406. The NLP engine 404 includes a pre-processing module 408, a subtopic detection module 410, and a sentiment analysis module 412 and is in communication with a remote ontology web service 414. In alternative embodiments, the application 402 includes some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the NLP engine 404 retrieves and analyzes documents, such as document 418, that include texts written in natural language. In some embodiments, the NLP engine 404 determines the sentiment of text from the document 418 by performing a sentiment analysis that includes extracting sentiment polarity from text in order to determine whether the sentiment of the text is positive, negative, or neutral. In some such embodiments, the sentiment analysis treats the whole document being analyzed as if it contains only a general opinion. Alternatively, in some embodiments the sentiment analysis employs Aspect-Based Sentiment Analysis (ABSA), which divides the main topic into subtopics and calculates the sentiment individually for each subtopic. In the illustrated embodiment, the NLP engine 404 extracts text data from the document, performs pre-processing on the text data, detects subtopics in the text data, and performs sentiment analysis for each subtopic. The NLP engine 404 provides the processing results to the reporting module 406, which summarizes the sentiment results for the document 418 and outputs the summary as a report 420. In the illustrated embodiment, the NLP engine 404 uses one or more ontologies provided by the ontology web service 414 for processing the document 418.

In some embodiments, the pre-processing module 408 uses one or more ontologies provided by the ontology web service 414 for pre-processing text from the document 418. In some such embodiments, the pre-processing module 408 performs pre-processing that includes stop word removal (deleting a, the, is, are, etc.), noise removal (e.g., deleting punctuation), and text normalization. In some such embodiments, the pre-processing module 408 performs a text normalization process that reduces the number of terms in the text by using a single term in place of groups of similar terms. In some such embodiments, the pre-processing module 408 identifies similar terms according to a process that includes mapping terms from the document to an ontology from the ontology web service 414. In some such embodiments, the pre-processing module 408 process for identifying similar terms then similar terms based on semantic relationships between the terms in the ontology being within a specified distance.

In some embodiments, the subtopic detection module 410 uses one or more ontologies provided by the ontology web service 414 for detecting subtopics in the text from the document 418. In some embodiments, the subtopic detection module 410 searches ontologies for terms extracted from the document 418. The subtopic detection module 410 then measures the frequency of those terms mapped onto different classes. The subtopic detection module 410 then infers document subtopics based on the most frequently mapped classes. For example, in some embodiments, the subtopic detection module 410 infers subtopics according to a designated number of classes most frequently mapped or according to classes having a number or percentage of mapped terms that meets or exceeds a designated threshold value.

In the illustrated embodiment, the outputs of the pre-processing module 408 and subtopic detection module 410 are provided to the sentiment analysis module 412. The sentiment analysis module 412 processes the received text data to classify contents of the document or document subtopics as positive, neutral, or negative. In some embodiments, the sentiment analysis module 412 uses a machine learning model to predict the sentiment classification of the received text. In some such embodiments, the machine learning model is based on a statistical algorithm, such as a deep learning or Naïve Bayes algorithm, trained to tag text data as positive, neutral, or negative. The NLP engine 404 provides the output of the sentiment analysis module 412 to the reporting module 406. The reporting module 406 generates a summary of the sentiment of the document 418 and outputs the summary as a report 420.

The ontologies provided by the ontology web service 414 are updated from time to time, or on demand in response to a request from the application 402, by the ontology updating system 416. For example, in some embodiments, the application 402 provides a knowledge base, such as an ontology or a relational database, to the ontology web service 414 that has concepts that overlap with an ontology maintained by the ontology web service 414. The ontology web service 414 then issues a request to the ontology updating system 416, which responds as described in connection with embodiments disclosed herein. For example, in the case where the ontology web service 414 receives an ontology from the application 402, the ontology updating system 416 generates a map between the ontology received from the application 402 and the ontology maintained by the ontology web service 414. In the case where the ontology web service 414 receives a knowledge base in a format other than an ontology, such as a relational database, the ontology updating system 416 generates a new ontology from the knowledge base, and then generates a map between the new ontology and the ontology maintained by the ontology web service 414.

Figure 5:
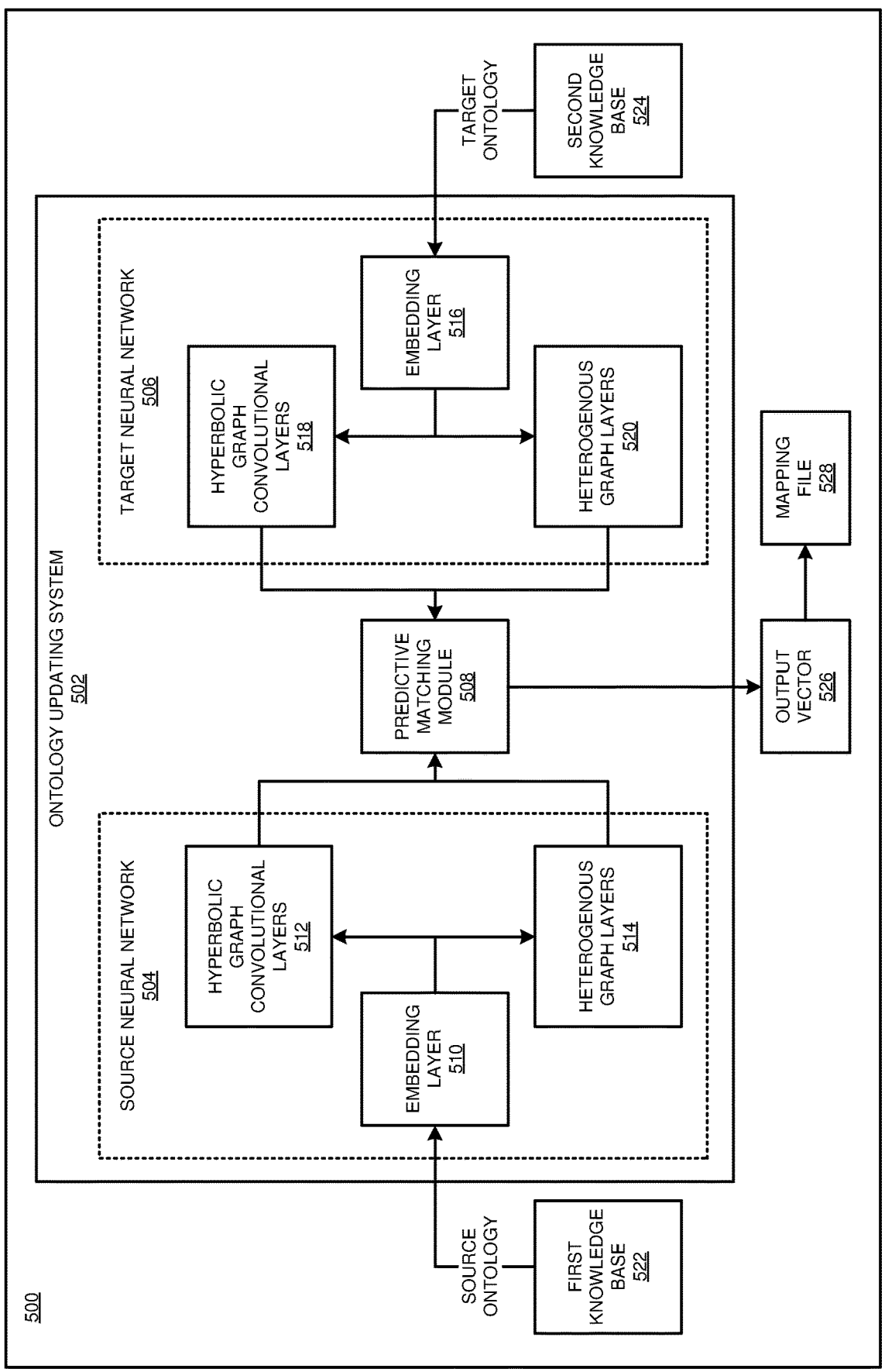
FIG. 5 depicts a block diagram of an example ontology graph neural network configuration (OntoGNN) implemented as an ontology updating system in accordance with an illustrative embodiment.

With reference to FIG. 5, this figure depicts a block diagram of an example ontology graph neural network configuration (OntoGNN) 500 implemented as an ontology updating system 502 in accordance with an illustrative embodiment. In a particular embodiment, ontology updating system 502 is an example of ontology updating system 416 of FIG. 4.

In some embodiments, the ontology updating system 502 includes a source neural network 504 and a target neural network 506 that both provide outputs to a predictive matching module 508. In some embodiments, the source neural network 504 and target neural network 506 are graph neural networks. In the illustrated embodiment, the source neural network 504 includes an embedding layer 510, one or more hyperbolic graph convolutional layers 512, and one or more heterogenous graph layers 514. Likewise, in the illustrated embodiment, the target neural network 506 includes an embedding layer 516, one or more hyperbolic graph convolutional layers 518, and one or more heterogenous graph layers 520. In alternative embodiments, the ontology updating system 502 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the OntoGNN 500 performs an ontology matching process of finding semantic correspondences between concepts in two ontologies (i.e., the source and target ontologies). The two ontologies define, standardize, and structure concepts in the same or overlapping domains. For example, in some embodiments, the source and target ontologies are medical ontologies created from various healthcare resources, semiautomatically or by human experts, and provide valuable knowledge to support many healthcare applications, such as medical content browsing, clinical documentation, and evidence-based healthcare. However, different medical datasets conform to different ontologies, preventing data integration and interoperability among medical databases and applications.

To address this challenge, the illustrated embodiment aligns the terminologies used in different ontologies by identifying correspondences among concepts across ontologies with overlapping content. The illustrated embodiment includes an ontology-matching framework named OntoGNN 500 based on graph representation learning. The OntoGNN 500 embeds ontologies into two representations that are complementary to each other. Both representations are jointly optimized to improve the ontology matching capabilities. In the illustrated embodiment, the OntoGNN 500 employs hyperbolic graph convolution layers 512, 518 to encode parent and child concepts of each concept in the hyperbolic space, capturing the hierarchical characteristics in an ontology, and employs heterogeneous graph layers 514, 520 to incorporate both the local structure and the global context into concept embeddings to enrich the features of each concept.

The overall architecture of the OntoGNN 500 inputs source and target ontologies from first knowledge base 522 and second knowledge base 524, respectively, into respective embedding layers 510, 516, which then split the respective inputs into two facets each—the output of embedding layer 510 is split between the one or more hyperbolic graph convolutional layers 512 and the one or more heterogenous graph layers 514, and the output from the embedding layer 516 is split between one or more hyperbolic graph convolutional layers 518 and one or more heterogenous graph layers 520. Specifically, the hierarchical facets are fed into the one or more hyperbolic graph convolutional layers 512 or one or more hyperbolic graph convolutional layers 518 and the non-hierarchical facets are fed into the one or more heterogenous graph layers 514 or one or more heterogenous graph layers 520. The predictive matching module 508 minimizes the contrastive matching loss to let the representations of matching concepts have a very small distance while those of unmatched concepts have a large distance. In the illustrated embodiment, the predictive matching module 508 outputs the distances for concept pairs as an output vector 526. In some embodiments, the output vector 526 is used to create or update a mapping file 528 that contains classes or concepts from external database systems or ontologies indexed to identical, similar, or related terms in an internal or known system.

Figure 6:
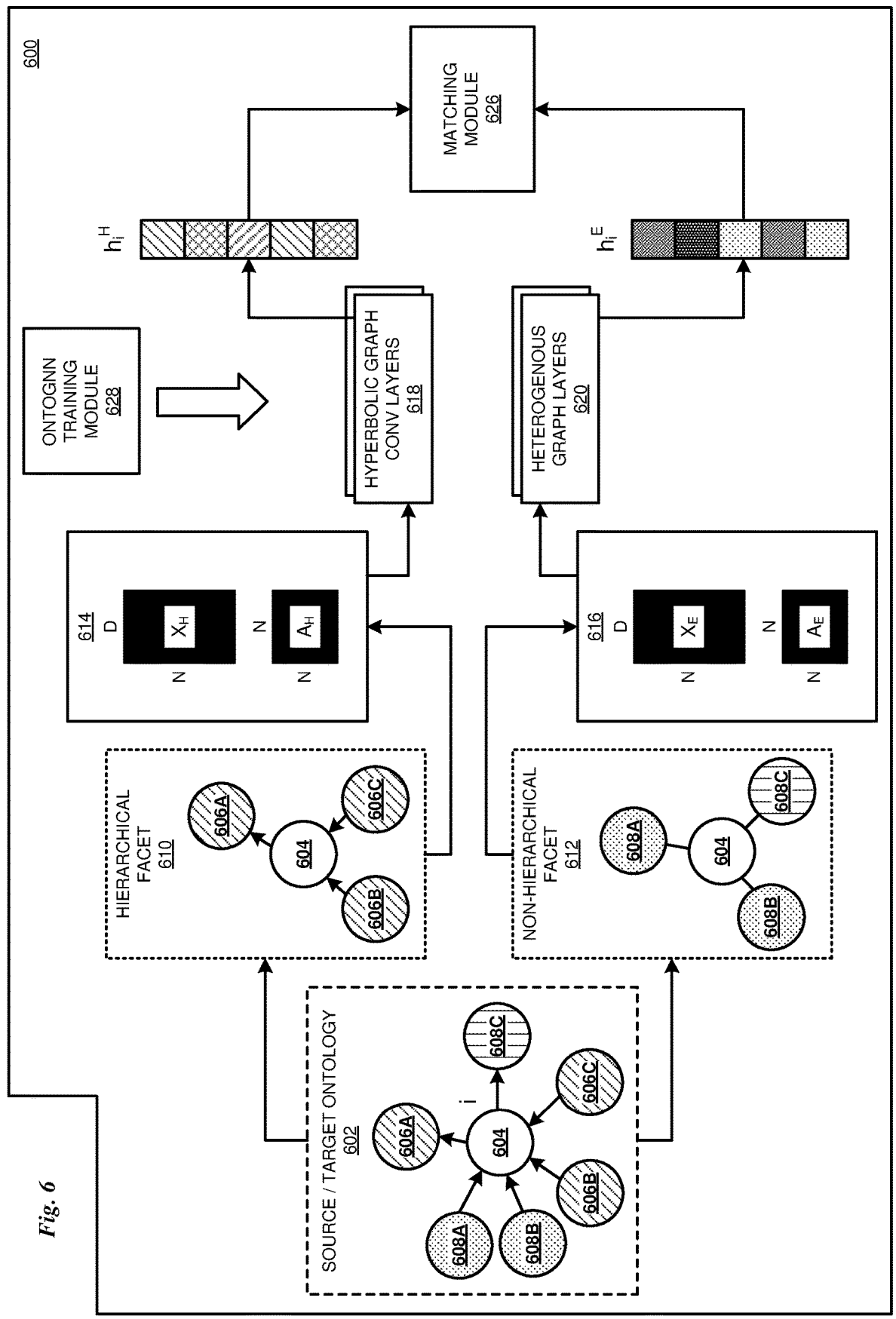
FIG. 6 depicts a schematic block diagram of an example OntoGNN in accordance with an illustrative embodiment and in which, for the sake of brevity and simplicity, only a source or target half of the OntoGNN is shown in FIG. 6, with it being understood that, as shown in FIG. 5, the other target/source half is identical or substantially the same as the half that is illustrated.

With reference to FIG. 6, this figure depicts a schematic block diagram of an example OntoGNN 600 in accordance with an illustrative embodiment. In a particular embodiment, ontology updating system 602 is an example of ontology updating system 416 of FIG. 4. For the sake of brevity and simplicity, only a source or target half of the OntoGNN 600 is shown in FIG. 6, with it being understood that the other target/source half is identical or substantially the same as shown in FIG. 5.

In the illustrated embodiment, the OntoGNN 600 inputs a key concept 604 represented as a node in the ontology updating system 602. The OntoGNN 600 processes the source neural network 604 along each of two different GNN processing paths. A first processing path includes one or more hyperbolic graph convolutional layers 618 to a matching module 626, and a second processing path includes one or more heterogenous graph layers 620 to the matching module 626. The OntoGNN 600 also identifies and inputs related concepts 606A-606C represented as nodes connected to the key concept node and having a hierarchical relationship with the key concept 604. The key concept 604 and hierarchical related concepts 606A-606C are referred to as a hierarchical facet 610. The OntoGNN 600 further identifies and inputs related concepts 608A-608C represented as nodes connected to the key concept node and having a non-hierarchical relationship with the key concept 604. The key concept 604 and non-hierarchical related concepts 608A-608C are referred to as a non-hierarchical facet 612.

In the illustrated embodiment, the OntoGNN 600 generates an embedding 614 from the graph data in the hierarchical facet 610 and generates an embedding 616 from the graph data in the hierarchical facet 612. For example, in some embodiments, the embeddings 614, 616 each includes an N×D input feature matrix $X_H$, $X_E$ for every key concept node, where N is the number of nodes, and D is the number of input features. Also, in some embodiments, the embeddings 614, 616 each includes a description of the graph structure of the ontology 602 in matrix form. In the illustrated embodiment, this description is provided in the form of an adjacency matrix $A_H$, $A_E$ (or some function thereof). The adjacency matrix $A_H$, $A_E$ is size N×N, where N is the number of nodes. In some embodiments, if $A_{i,j}=1$ if there is an edge from vertex $V_i$ to vertex $V_j$, and $A_{i,j}=0$ otherwise. In this case, vertex $V_i$ has position i in A, and if $A_{i,j}=1$ then $V_i$ and $V_j$ are adjacent.

In some embodiments, a GNN embeds nodes into Euclidean space, but tend to incur a large distortion with hierarchical structures. To avoid this, the illustrated embodiments use the hyperbolic space for the embedding since it is amenable for learning concept hierarchies. Compared to Euclidean space, hyperbolic space better captures the hierarchical characteristic of ontologies. In the illustrated embodiment, the OntoGNN 600 includes one or more hyperbolic graph convolutional layers 618, which leverage both the expressiveness of GNNs and hyperbolic geometry to learn node representations for graphs with hierarchical structures. In some embodiments, the one or more hyperbolic graph convolutional layers 618 first establish mapping between tangent (Euclidean) and hyperbolic spaces by exponential and logarithmic maps. In some embodiments, the OntoGNN 600 uses the exponential map to project the node embeddings from a Euclidean space to a hyperbolic space, and a logarithmic map reverses the mapping back to the Euclidean space.

In some embodiments, the one or more hyperbolic graph convolutional layers 618 aggregates features from the local neighborhood of the key concept 604 node. Since there is no notion of vector space structure in a hyperbolic space, the OntoGNN 600 maps embeddings to the tangent space, performs the aggregation in the tangent space, and then maps the aggregated embeddings back to the hyperbolic space. Furthermore, in some embodiments, the OntoGNN 600 utilize an attention mechanism to learn the importance of each neighboring node and aggregate neighbors' embeddings according to their importance. Also, in some embodiments, the OntoGNN 600 use a non-linear activation function to learn non-linear transformations by first applying the Euclidean non-linear activation in the tangent space and then mapping back to the hyperbolic space. In some embodiments, the hyperbolic embeddings at the last layer are used to predict the concept similarity. In some embodiments, the OntoGNN 600 uses a sigmoid function to compute probability scores for edges.

In some embodiments, one or more heterogenous graph layers 620 capture the non-hierarchical structure in an ontology using a GNN, such as a Relational Graph Convolutional Network (R-GCN) R-GCN for its ability to model multi-relational graphs. Specifically, R-GCN distinguishes different neighbors with relation-specific weight matrices. In the convolutional layers, each representation vector is updated by accumulating the vectors of neighboring nodes through a normalized sum.

Figure 7:
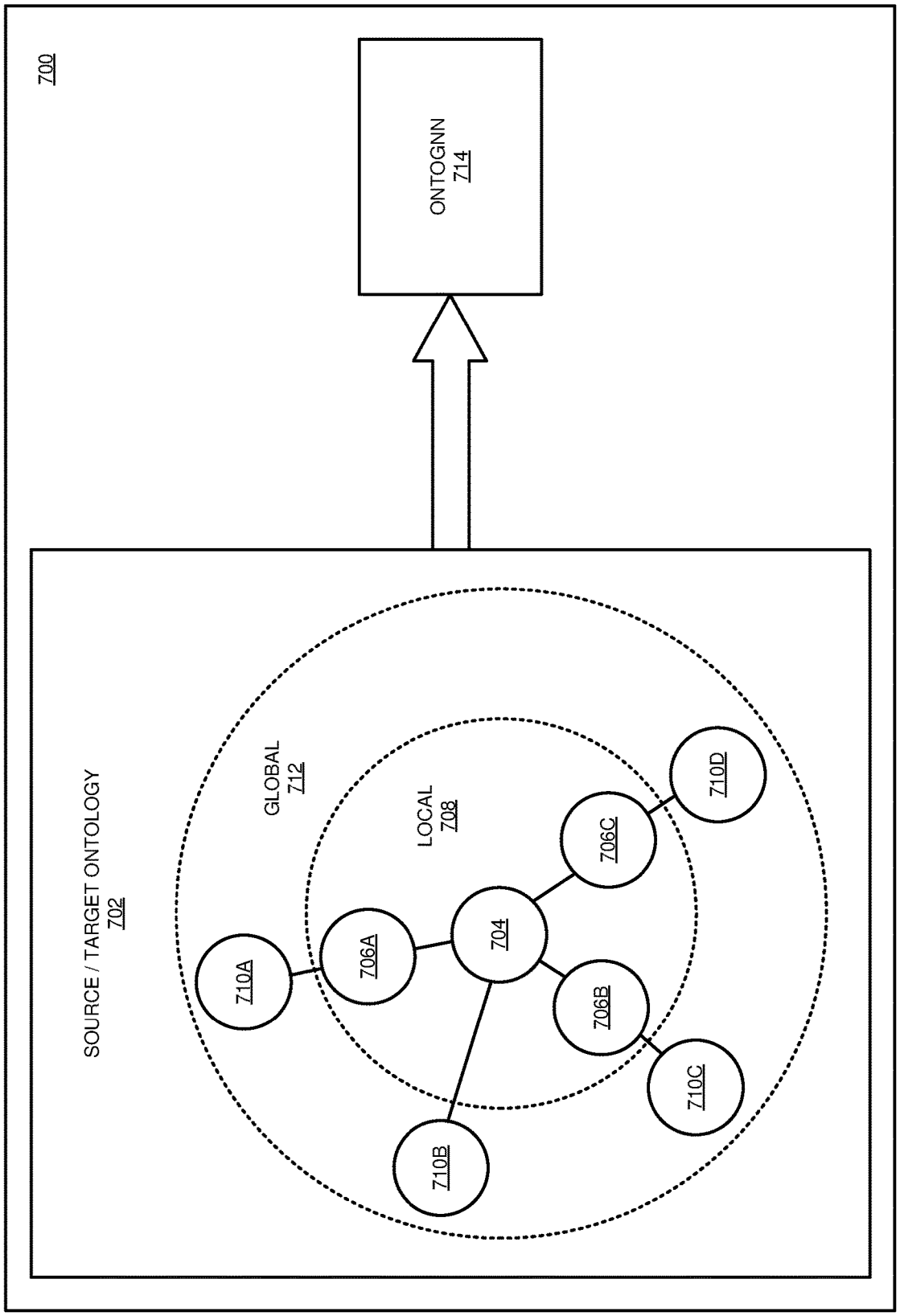
FIG. 7 depicts a schematic block diagram of an example configuration for an OntoGNN in accordance with an illustrative embodiment.

With reference to FIG. 7, this figure depicts a schematic block diagram of an example configuration 700 for an OntoGNN 714 in accordance with an illustrative embodiment. In a particular embodiment, OntoGNN 714 is an example of OntoGNN 500 of FIG. 5 and OntoGNN 600 of FIG. 6.

In the illustrated embodiment, the OntoGNN 714 inputs a key concept 704 represented as a node in the source/target ontology 702. The OntoGNN 714 processes the key concept 704 along each of two different GNN processing paths. The OntoGNN 714 also identifies and inputs related concepts 706A-706C represented as nodes connected to the key concept node and having a non-hierarchical relationship with the key concept 704. The OntoGNN 714 further identifies and inputs related concepts 710A-710D represented as nodes connected to the key concept node 704 directly or indirectly. In this embodiment, the related concepts 706A-706C are in a local region 708 of the source/target ontology 702, and the related concepts 710A-710D are in a global region 712 of the source/target ontology 702.

One limitation of the embodiment shown in FIG. 6 is that it focuses only on the local context of a concept and ignores the position of the concept within the broader context of the entire ontology. Therefore, the embodiment shown in FIG. 7 also uses the top-level concepts in an ontology 702. The top-level concepts often provide additional semantic information that can influence how the final embeddings are aggregated in the OntoGNN 714. Thus, the embodiment shown in FIG. 7 incorporates a set of "global" contexts and enriches each node feature with its corresponding global embeddings.

Referring again to FIG. 6, the matching module 626 receives learned concept representations $h_i^H$ and $h_i^E$ from respective processing paths of the GNN. The matching module 626 receives learned concept representation hill from the one or more hyperbolic graph convolutional layers 618 on the hyperbolic processing path and receives learned concept representation $h_E^i$ from the one or more heterogenous graph layers 620 on the heterogeneous processing path $h_i^E$. The matching module 626 will receive two of each of the learned concept representations $h_i^H$ and $h_i^E$—a first pair of the learned concept representations $h_i^H$ and $h_i^E$ will be from the source ontology, and a second pair of the learned concept representations $h_i^H$ and $h_i^E$ will be from the target ontology. The matching module 626 merges each pair of learned concept representations $h_i^H$ and $h_i^E$ into a respective unified concept representation h. In some embodiments, the matching module 626 uses concatenation to unify the representations of the learned concepts. In some embodiments, the matching module 626 takes pairs of concept embeddings from the source and target ontologies and outputs an output vector of prediction scores, for example using a multilayer perceptron (MLP) with one hidden layer and a Leaky Rectified Linear Units (ReLU) activation function, or alternatively a multi-head attention-based transformer encoder module to replace the MLP. In some embodiments, the matching module 626 minimizes the contrastive matching loss to let the embeddings of known matched concepts (positive) have a small distance while the unmatched (negative) pairs have a relatively large distance.

In the illustrated embodiment, the OntoGNN training module 628 may be used to train the OntoGNN 600. The OntoGNN training module 628 trains the combination of the hyperbolic graph convolution layers and the and heterogeneous graph models together with the matching module. In some embodiments, the OntoGNN training module 628 trains the OntoGNN 600 to minimize a final joint loss function.

Figure 8:
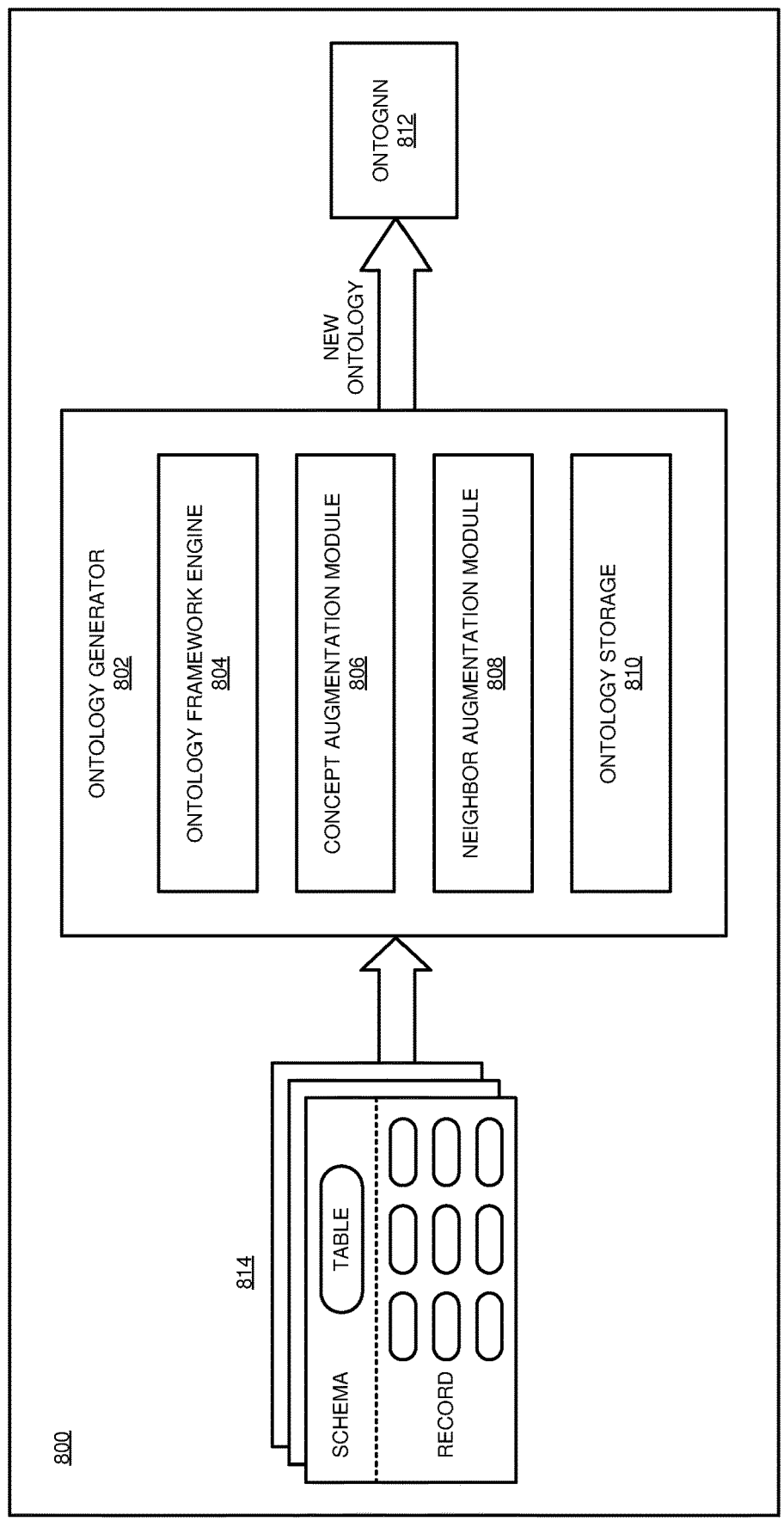
FIG. 8 depicts a block diagram of an example configuration that includes an ontology generator in accordance with an illustrative embodiment.

With reference to FIG. 8, this figure depicts a block diagram of an example configuration 800 that includes an ontology generator 802 in accordance with an illustrative embodiment. In a particular embodiment, ontology generator 802 is an example of an ontology updating system 416 of FIG. 4.

In the illustrated embodiment, the ontology generator 802 includes an ontology framework engine 804, a concept augmentation module 806, a neighbor augmentation module 808, and ontology storage 810. In alternative embodiments, the ontology generator 802 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, it is desirable to match elements of a relational database 814 (such as tables and columns) to an external ontology (e.g., target ontology from second knowledge base 524 of FIG. 5) to standardize terminology and vocabularies, to discover additional relationships, and support new queries to enable semantically rich applications. In some embodiments, an ontology is created from a relational database by using only the metadata information. Although these ontologies capture schema-level details of the underlying data, they are not as semantically rich as the standard ontologies created by experts.

In some embodiments, an improved system and process for automatic ontology creation is described with reference to ontology generator 802. In some such embodiments, the ontology framework engine 804 first creates an ontology from the relational metadata. The concept augmentation module 806 and neighbor augmentation module 808 then employ effective augmentation heuristics to enrich the new ontology. Finally, the new ontology is stored in ontology storage 810 and provided to OntoGNN 812 to find matches between the new ontology and a standard ontology (e.g., target ontology from second knowledge base 524 of FIG. 5).

In some embodiments, the ontology framework engine 804 maps constructs of relational database 814 to nodes of a new ontology using the names of constructs of the relational database (e.g., names of tables, columns, etc.) as the names of constructs of the ontology. In some embodiments, the concept augmentation module 806 adds an instance-level concept to the new ontology for each distinct value in the relational tables of the relational database 814. The ontology generator 802 connect these new concepts to the nodes created by the ontology framework engine 804 via new "instance of" relationships. This enriches the new ontology with available information from the relational database relational database 814 and allows the ontology generator 802 to bootstrap seed concept matching between two ontologies using exact string matching algorithms. Other approximate string matching algorithms (e.g., edit-distance-based or embeddings-based algorithms) can be used as well, depending on the accuracy requirement.

In some embodiments, the neighbor augmentation module 808 adds edges among the nodes of the new ontology created by the ontology framework engine 804 and the concept augmentation module 806. Specifically, if two concepts i and j of an external ontology (e.g., target ontology from second knowledge base 524 of FIG. 5) have an edge while their counterparts $i_0$ and $j_0$ in the new ontology do not, then the neighbor augmentation module 808 adds an edge between $i_0$ and $j_0$ in the new ontology. Thus, in some embodiments, the neighbor augmentation module 808 searches the external ontology to identify pairs of concepts that are connected and that correspond with a pair of concepts in the new ontology that lack a connection. When the neighbor augmentation module 808 identifies such concepts in the new ontology, the neighbor augmentation module 808 augments the new ontology to include a connection between the pair of concepts. The goal is to fill the semantic gap between the new and external ontologies by adding missing structural information. The ontology generator 802 then stores the new ontology in electronic memory, such as ontology storage 810 and provides the new ontology to an OntoGNN 812 for processing, for example part of a response to the update request from the requesting system.

Figure 9:
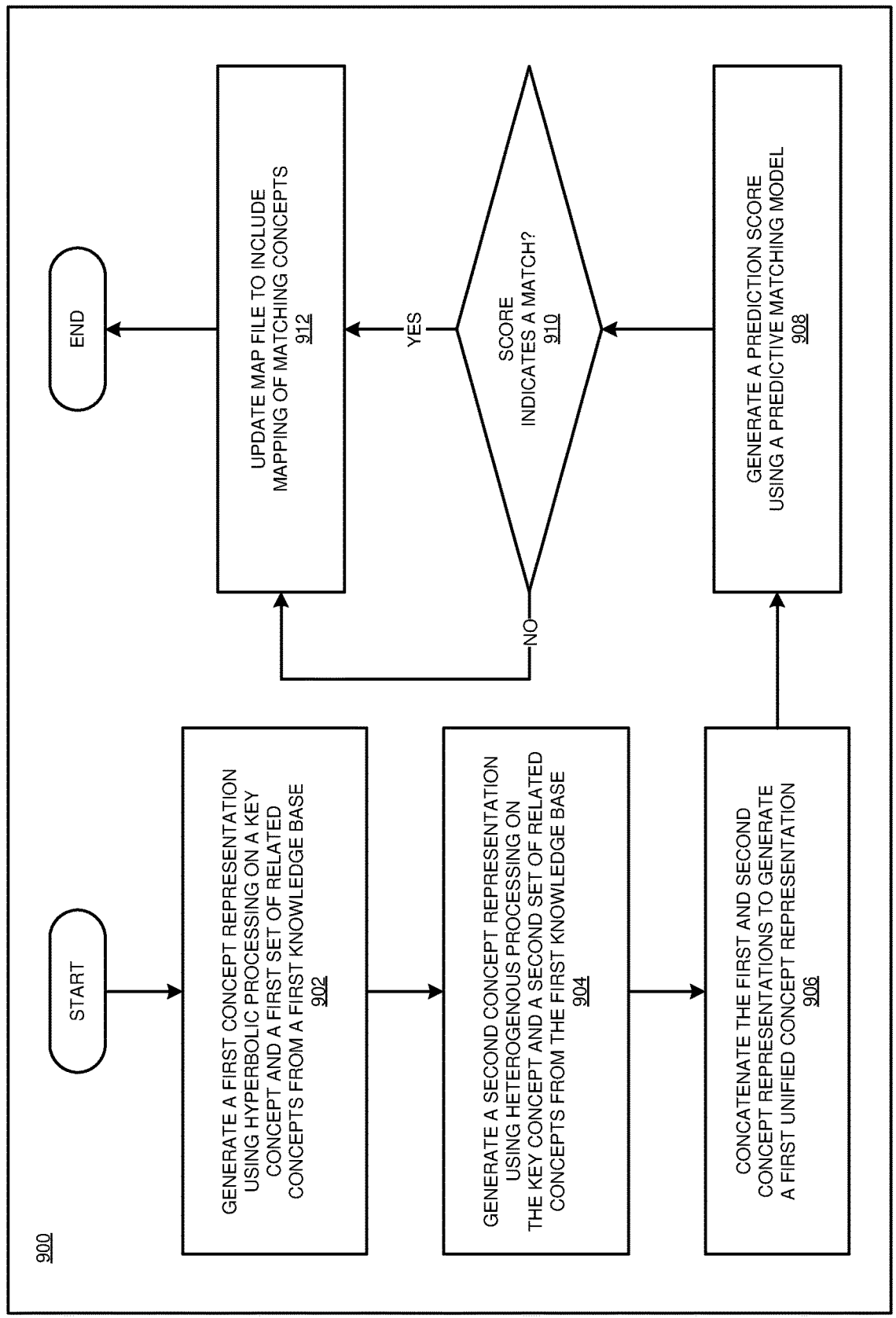
FIG. 9 depicts a flowchart of an example process for updating an ontology in accordance with an illustrative embodiment.

With reference to FIG. 9 this figure depicts a flowchart of an example process 900 for updating an ontology in accordance with an illustrative embodiment. In a particular embodiment, the application 402 of FIG. 4 carries out the process 900.

In an embodiment, at block 902, the process generates a first concept representation using hyperbolic processing on a key concept and a first set of related concepts from a first knowledge base. Next, at block 904, the process generates a second concept representation using heterogenous processing on the key concept and a second set of related concepts from the first knowledge base. Next, at block 906, the process concatenates the first and second concept representations to generate a first unified concept representation. Next, at block 908, the process generate a prediction score using a using a predictive matching model. Next, at block 910, the process determines whether the prediction score indicates a match. If so, then at block 912, the process updates a map file to include mapping of matching concept. Otherwise, the process ends.

Figure 10:
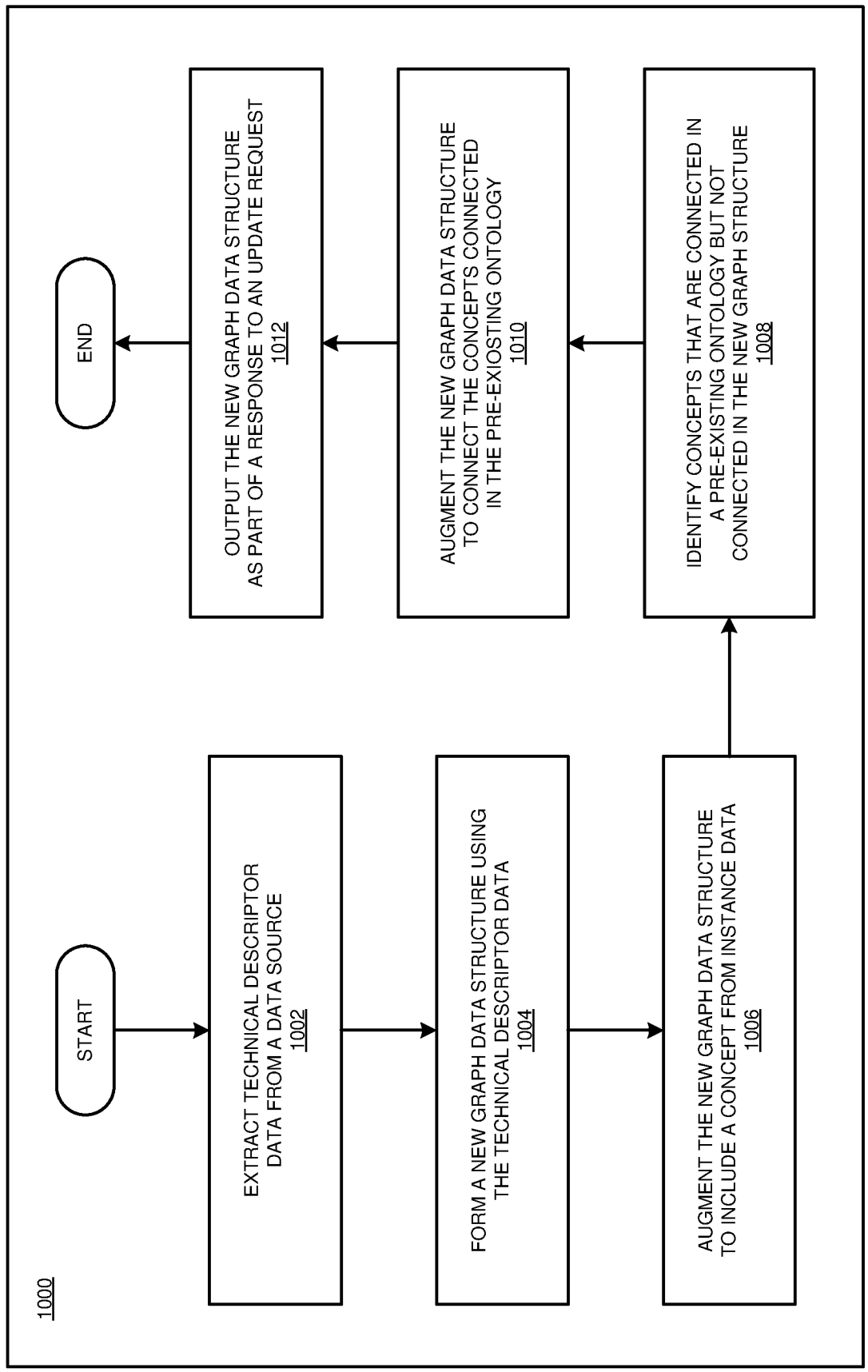
FIG. 10 depicts a flowchart of an example process for generating a new ontology from a relational database in accordance with an illustrative embodiment.

With reference to FIG. 10 this figure depicts a flowchart of an example process 1000 for generating a new ontology from a relational database in accordance with an illustrative embodiment. In a particular embodiment, the ontology generator 802 of FIG. 8 carries out the process 1000.

In an embodiment, at block 1002, the process extracts, responsive to an update request from a remote requesting system, technical descriptor data from a data source. In some embodiments, the technical descriptor data describes a construct of a data structure of the data source. Next, at block 1004, the process forms a new graph data structure using the technical descriptor data extracted from the data source. Next, at block 1006, the process augments the new graph data structure to include a concept based on a value from instance data from the data source. Next, at block 1008, the process identifies a first pair of concepts that are connected in a pre-existing ontology that correspond with a second pair of concepts that lack a connection therebetween in the new graph structure. Next, at block 1010, the process augments the new graph data structure to include a connection between the second pair of concepts. Next, at block 1012, the process outputs the new graph data structure as part of a response to the update request from the requesting system.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   extracting, responsive to an update request from a remote requesting system, technical descriptor data from a data source, wherein the technical descriptor data describes a construct of a data structure of the data source;
   forming a new graph data structure using the technical descriptor data extracted from the data source, wherein the forming the new graph data structure comprises projecting node embeddings into a hyperbolic space representation that captures hierarchical and non-hierarchical connections between concepts;
   augmenting the new graph data structure to include a concept based on a value from instance data from the data source;
   identifying a first pair of concepts that are connected in a pre-existing ontology that correspond with a second pair of concepts that lack a connection therebetween in the new graph structure, wherein the identifying the first pair of concepts that are connected in the pre-existing ontology comprises identifying a hierarchical connection between concepts of the first pair of concepts, and a non-hierarchical connection between concepts of the first pair of concepts;
   identifying a top-level concept that is connected to the first pair of concepts in the pre-existing ontology;
   augmenting the new graph data structure to include a connection between the second pair of concepts, wherein the augmenting the new graph data is based at least in part on the hierarchical connection between concepts of the first pair of concepts, the non-hierarchical connection between concepts of the first pair of concepts, and the top-level concept that is connected to the first pair of concepts in the pre-existing ontology; and outputting the new graph data structure as part of a response to the update request from the requesting system.

2. The method of claim 1, wherein the technical descriptor data comprises technical metadata.

3. The method of claim 1, wherein the data source comprises a relational database.

4. The method of claim 1, wherein the technical descriptor data comprises schema level data.

5. The method of claim 4, wherein the forming of the new graph data structure using the technical descriptor data comprises adding schema level nodes corresponding to respective schema values of the schema level data.

6. The method of claim 5, wherein the augmenting of the new graph data structure to include the concept further comprises identifying each distinct value in the instance data of the data source.

7. The method of claim 6, wherein the augmenting of the new graph data structure to include the concept further comprises adding, for each distinct value identified in the instance data of the data source, an instance concept connected to a respective one of the schema level nodes.

8. The method of claim 1, wherein the new graph structure comprises a new ontology.

9. The method of claim 8, further comprising updating the new ontology using an OntoGNN.

10. The method of claim 9, wherein the updating of the new ontology comprises using the new ontology as a source ontology for the OntoGNN and using the pre-existing ontology as a target ontology for the OntoGNN.

11. The method of claim 10, wherein the updating of the new ontology using the OntoGNN comprises:

generating a first concept representation based on a first portion of the new ontology using a first processing path of the OntoGNN, the first processing path comprising a first hyperbolic graph convolution layer, the first portion of the new ontology comprising a first key concept;

generating a second concept representation based on a second portion of the new ontology using a second processing path of the OntoGNN, the second processing path comprising a first heterogenous graph convolution layer, the second portion of the new ontology comprising the first key concept;

generating a first unified concept representation including concatenating the first concept representation with the second concept representation; and generating a prediction score using a predictive matching module, the predictive score being indicative of an extent of a match between the first unified concept representation and a second unified concept representation from the pre-existing ontology.

12. A computer usable program product for cognitive analysis of a project description, the computer program product comprising one or more computer readable storage media, and program instructions collectively stored on the one or more computer readable storage media, the program instructions executable by a processor to cause the processor to perform operations comprising:

extracting, responsive to an update request from a remote requesting system, technical descriptor data from a data source, wherein the technical descriptor data describes a construct of a data structure of the data source;

forming a new graph data structure using the technical descriptor data extracted from the data source;

augmenting the new graph data structure to include a concept based on a value from instance data from the data source;

identifying a top-level concept that is connected to the first pair of concepts in the pre-existing ontology;

identifying a first pair of concepts that are connected in a pre-existing ontology that correspond with a second pair of concepts that lack a connection therebetween in the new graph structure;

augmenting the new graph data structure to include a connection between the second pair of concepts wherein the augmenting the new graph data is based at least in part on a connection between concepts of the first pair of concepts, and a connection between the top-level concept that is connected to the first pair of concepts in the pre-existing ontology; and outputting the new graph data structure as part of a response to the update request from the requesting system.

13. The computer usable program product of claim 12, wherein the stored program instructions are stored in a computer readable storage device in a data processing system, and wherein the stored program instructions are transferred over a network from a remote data processing system.

14. The computer usable program product of claim 12, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the computer usable code associated with the request; and program instructions to generate an invoice based on the metered use.

15. The computer usable program product of claim 12, wherein the technical descriptor data comprises technical metadata.

16. The computer usable program product of claim 12, wherein the data source comprises a relational database.

17. The computer usable program product of claim 12, wherein the technical descriptor data comprises schema level data.

18. A computer system comprising a processor and one or more computer readable storage media, and program instructions collectively stored on the one or more computer readable storage media, the program instructions executable by the processor to cause the processor to perform operations comprising:

extracting, responsive to an update request from a remote requesting system, technical descriptor data from a data source, wherein the technical descriptor data describes a construct of a data structure of the data source;

forming a new graph data structure using the technical descriptor data extracted from the data source, wherein the forming the new graph data structure comprises projecting node embeddings into a hyperbolic space representation that captures hierarchical and non-hierarchical connections between concepts;

augmenting the new graph data structure to include a concept based on a value from instance data from the data source;

identifying a first pair of concepts that are connected in a pre-existing ontology that correspond with a second pair of concepts that lack a connection therebetween in the new graph structure, wherein the identifying the first pair of concepts that are connected in the pre-existing ontology comprises identifying a hierarchical connection between concepts of the first pair of concepts, and a non-hierarchical connection between concepts of the first pair of concepts;

identifying a top-level concept that is connected to the first pair of concepts in the pre-existing ontology;

augmenting the new graph data structure to include a connection between the second pair of concepts, wherein the augmenting the new graph data is based at least in part on the hierarchical connection between concepts of the first pair of concepts, the non-hierarchical connection between concepts of the first pair of concepts, and the top-level concept that is connected to the first pair of concepts in the pre-existing ontology; and outputting the new graph data structure as part of a response to the update request from the requesting system.

19. The computer system of claim 18, wherein the technical descriptor data comprises technical metadata.

20. The computer system of claim 18, wherein the data source comprises a relational database.

\* \* \* \* \*